United States Patent [19]

De Loach, Jr.

[11] 4,403,139

[45] Sep. 6, 1983

[54] REDUNDANT LIGHT SOURCE CIRCUIT

[75] Inventor: Bernard C. De Loach, Jr., Murray Hill, N.J.

[73] Assignee: Bell Telephone Laboratories, Incorporated, Murray Hill, N.J.

[21] Appl. No.: 255,452

[22] Filed: Apr. 20, 1981

[51] Int. Cl.³ .............................................. G01J 1/32
[52] U.S. Cl. .................... 250/205; 315/154; 455/613
[58] Field of Search ................. 250/551, 206, 214 R; 455/601, 609–613; 362/227, 254; 315/152–154

[56] References Cited

U.S. PATENT DOCUMENTS 3,765,006  10/1973  Takahashi et al. ................. 315/154
4,008,390   2/1977  Runge .................................. 250/205
4,281,416   7/1981  Seki et al. ........................... 455/613

FOREIGN PATENT DOCUMENTS 2053462A  of 0000  United Kingdom .

*Primary Examiner*—David C. Nelms
*Attorney, Agent, or Firm*—Michael J. Urbano

[57] ABSTRACT

Circuits for selectively operating redundant light sources (lasers or LEDs) in lightwave communication systems are described.

9 Claims, 2 Drawing Figures

REDUNDANT LIGHT SOURCE CIRCUIT

BACKGROUND OF THE INVENTION

This invention relates to lightwave communication systems and, more particularly, to circuits for selectively operating redundant light sources in fiber optics systems.

In certain lightwave system applications, especially those where maintenance is difficult, selectively operated redundant light sources are a useful expedient. In particular, if the operating source fails, the system as a whole need not fail because circuitry is provided which is responsive to the failure mode of the source to automatically bring into operation a redundant source.

One application fitting this prescription is a lightwave submarine cable system in which a fiber optic cable connecting transoceanic terminals is laid on the ocean floor. The cable includes a plurality of repeaters spaced along its length for amplifying the lightwaves. In one contemplated system, the lightwaves are detected in each repeater by a photodiode. The corresponding electrical signals are amplified, and the lightwaves are then regenerated via a light source. Without redundancy the failure of the repeater light source would interrupt transmission and hence customer service. The interruption could extend for long periods of time because, obviously, repairing the repeater might entail raising the cable from the ocean floor to a repair ship on the ocean surface. On the other hand, the use of redundant sources in the repeaters would reduce the likelihood that such expensive and time-consuming repairs would be encountered.

SUMMARY OF THE INVENTION

Accordingly, my invention is a circuit for selectively operating redundant light sources in which a first circuit branch includes a normally closed first switch, a first light source in series with the first switch for generating radiation within a prescribed range of a predetermined parameter level, a second circuit branch in parallel with the first branch including a normally open second switch, a second light source in series with the second switch, feedback means responsive to a portion of the radiation of the first source for generating a signal which keeps the first switch closed while the radiation of the first source is within the prescribed range and which opens the first switch when that radiation is outside the prescribed range, and means responsive to the switching of the first switch from closed to open for generating a signal which closes the second switch and thereby causes the second light source to emit radiation.

The predetermined parameter level is a matter of design consideration. Examples include: (1) the minimum average optical power emitted by the source, in which case the prescribed range might be all optical powers above the minimum; (2) the maximum optical power in the OFF state of a digitally modulated source, in which case the prescribed range might include all optical powers below the maximum; or (3) the maximum bit-error rate of such a digital source, in which case the prescribed range might include all rates below the maximum. Two illustrative embodiments are described. In the first, which is applicable to either semiconductor lasers or LEDs, a portion of the light source radiation is coupled to a photodiode which generates a control signal on the control electrode of the first switch. In the second, which is applicable to semiconductor lasers, the circuit includes a typical feedback arrangement for providing long-term stability to the laser light output. The photodiode output provides the input to the feedback circuit, and the error signal of feedback circuit is compared with an electrical reference signal to generate the control signal on the control electrode of the first switch. The electrical reference signal is related to the predetermined parameter level.

BRIEF DESCRIPTION OF THE DRAWING

My invention, together with its various features and advantages, can be readily understood from the following, more detailed description taken in conjunction with the accompanying drawing in which.

DETAILED DESCRIPTION

Figure 1:
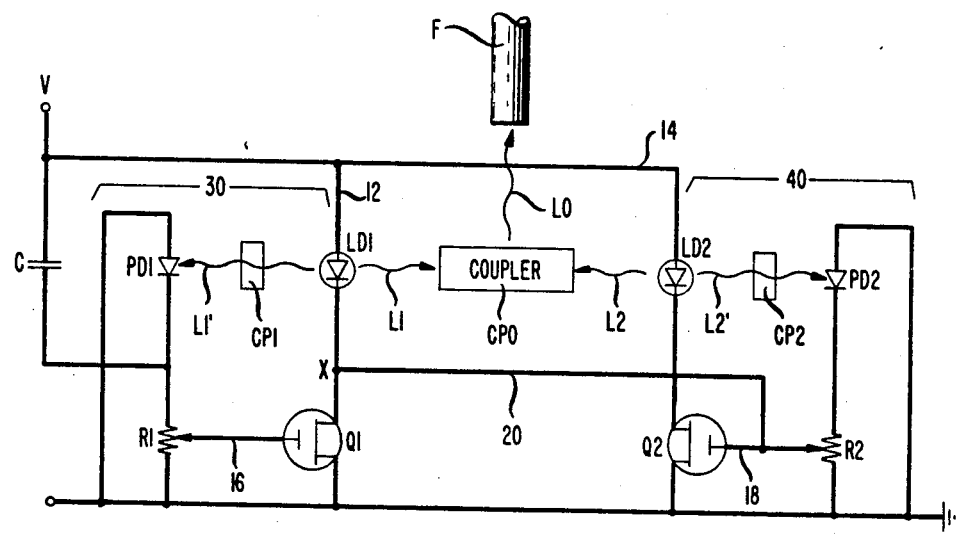
FIG. 1 is a schematic of a circuit for selectively operating redundant semiconductor lasers or LEDs in accordance with one embodiment of my invention.

With reference now to FIG. 1, there is shown a circuit 10 for selectively operating redundant light sources LD1 and LD2. For simplicity, the selective operation of the sources will be described in terms of sensing when the radiation emitted falls below a predetermined minimum average power level. As mentioned previously, however, other predetermined parameter levels could be sensed depending on design considerations.

The circuit includes first and second branches 12 and 14 connected in parallel with one another between a source of supply voltage V and a source of reference potential depicted as ground. The first branch includes the first light source LD1 and a normally closed switch Q1 connected in series with one another. The second branch 14 includes the second light source LD2 and a normally open switch Q2 connected in series with one another. The switches Q1 and Q2 have control electrodes 16 and 18, respectively, which enable the state of the switches to be changed from closed to open and conversely depending upon the presence or absence of a control signal on their control electrodes.

In this context the terms closed and open have their conventional meanings: a closed switch is in a low impedance conducting state, whereas an open switch is in a high impedance nonconducting state.

Under these circumstances, the source LD1 is ON and emits radiation L1, whereas source LD2 is OFF and emits no radiation. As long as source LD1 continues to emit radiation L1 above a predetermined minimum average light power level, the states of source LD1 and source LD2 will remain unchanged. However, when the light output of source LD1 drops below that minimum level, feedback means 30 senses the drop in light power and generates a control signal on the control electrode 16 which turns off switch Q1 and source LD1. As a consequence, the voltage at node X between source LD1 and switch Q1 rises to the supply level V. Means 20 responsive to the change of state of switch Q1 is provided for changing switch Q2 from OFF to ON. This latter means is depicted as conductor 20 connected between node X and the control electrode 18 of switch Q2. As a consequence, switch Q2 turns on, and source LD2 emits radiation L2.

Feedback means 30 which senses the drop in light power level of source LD1 illustratively comprises a photodiode PD1 which receives a portion L1' of the radiation output of source LD1 and converts it to a corresponding electrical signal. Photodidode PD1 is connected in parallel with a resistor R1 which in turn is connected between the control electrode 16 of switch Q1 and ground. Therefore, the photocurrent generated in photodiode PD1 by radiation portion L1' generates a proportional voltage across resistor R1 and thereby turns off switch Q1 when that voltage drops below an electrical reference signal related to the minimum average light power level of source LD1.

Similar feedback means 40 comprising photodiode PD2 and resistor R2 are shown coupled between the control electrode 18 of switch Q2 and a portion L2' of the radiation output of source LD2. These latter elements are not essential but could be utilized when more than two redundant light sources are employed. In this regard, the resistance of R2 should be large enough to prevent any substantial current flow through source LD1 when switch Q1 is OFF.

Also shown in FIG. 1 is a capacitor C connected between the voltage source V and the parallel combination of photodiode PD1 and resistor R1. Basically this capacitor functions under circuit start-up conditions; that is, when the voltage supply V is first turned on, a transient voltage across capacitor C turns on switch Q1 and source LD1. When the transient has died out, however, the capacitor C decouples the DC supply voltage V from the control electrode 16 of switch Q1.

For completeness, the sources LD1 and LD2 are shown coupled to their respective photodiodes PD1 and PD2 via a generalized form of coupling means CP1 and CP2. In addition, in fiber optic applications the primary radiation outputs L1 and L2 of sources LD1 and LD2, respectively, are shown coupled to another generalized coupling means CP0 to generate radiation L0 for transmission over an optical fiber F. These couplers are well known in the art and may take on a variety of configurations including various lens configurations, beam splitters, prism couplers or beveled fiber couplers. Where sources LD1 and LD2 are semiconductor lasers, it is also well known that the radiation portions L1' and L2' may be derived from the light beam emanating from the front laser mirror (as in U.S. Pat. No. 4,165,496 granted to M. Di Domenico, Jr. et al on Aug. 21, 1979) or emanating from the back laser mirror (as in U.S. Pat. No. 4,252,457 granted to W. W. Benson et al on Feb. 24, 1981).

In an illustrative embodiment of the circuit of FIG. 1, the sources LD1 and LD2 comprise either semiconductor lasers or light-emitting diodes, and the switches Q1 and Q2 comprise field effect transistors (FETs). In particular, the switch Q1 would be an enhancement-mode FET which is normally ON, whereas switch Q2 would be a depletion-mode FET which is normally OFF. In this case, the control electrodes 16 and 18 correspond to the gates of the FETs. The drain and source electrodes of these FETs are shown as connected between ground and the sources LD1 and LD2.

In the embodiment shown in FIG. 1 no explicit means is shown for modulating the sources LD1 and LD2. It is, of course, well known in the art that suitable drive circuits could readily be incorporated in order to modulate the radiation outputs L1 and L2 in a digital, analog, or other fashion.

Figure 2:
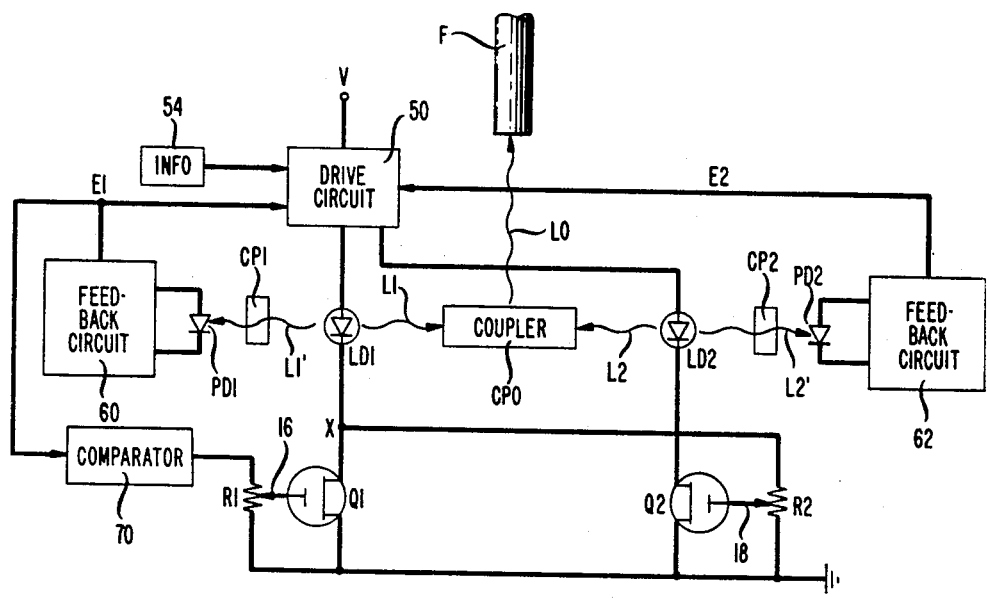
FIG. 2 is a schematic of a circuit for selectively operating redundant semiconductor lasers in accordance with another embodiment of my invention.

A circuit incorporating such a drive circuit for operating laser diodes LD1 and LD2 is depicted in FIG. 2. Here, the drive circuit 50 is shown connected in series between the voltage supply V and the laser diodes LD1 and LD2, respectively. The drive current which the drive circuit supplies to the laser diodes is in turn controlled by an information source 54. The basic configuration and operation of the switches Q1 and Q2 is essentially identical to that described with reference to FIG. 1. However, instead of applying the output signals of the photodiodes PD1 and PD2 directly to control electrodes 16 and 18 of switches Q1 and Q2 as in FIG. 1, these signals instead supply the inputs to feedback circuits 60 and 62. The latter circuits are well known in the art and are utilized to stabilize the radiation output of laser diodes by providing error signals E1 and E2 which are coupled to the drive circuit 50 thereby adjusting the drive current to the laser diodes to compensate for relatively long-term changes (e.g., aging) in the laser diodes.

In accordance with this aspect of my invention, the error signal E1 generated by feedback circuit 60 is also compared with a reference signal in comparator 70, and the output of the comparator is coupled through resistor R1 to the control electrode 16 of switch Q1. The level of this reference signal is set in accordance with predetermined design criteria to establish the voltage level on the control electrode 16 which will cause switch Q1 and hence source LD1 to be turned off. As before, the reference signal is also related to the minimum average power level of the radiation output of source LD1.

Although not shown, a similar comparator connected between the error signal output E2 of feedback circuit 62 and the control electrode 18 of switch Q2 could also be incorporated into the circuit of FIG. 2.

It is to be understood that the above-described arrangements are merely illustrative of the many possible applications of the principles of the invention. Numerous and varied other arrangements can be devised in accordance with these principles by those skilled in the art without departing from the spirit and scope of the invention.

What is claimed is:

1. A redundant light source circuit comprising
   a first circuit branch including
      a normally closed first switch having a first control electrode for opening said first switch,
      a first light source in series with said first switch for generating radiation within a prescribed range of a predetermined parameter level,
   a second circuit branch, in parallel with said first branch, including
      a normally open second switch having a second control electrode for closing said second switch,
      a second light source in series with said second switch for generating radiation when said second switch is closed,
   feedback means responsive to a portion of the radiation of said first source for generating voltage coupled to said first control electrode so that said first switch remains closed while the radiation of said first source is within said prescribed range and is opened when the radiation of said first source is outside said prescribed range, thereby turning off said first source, and
   means responsive to the switching of said first switch from closed to open for applying voltage to said second control electrode effective to close said second switch and cause said second source to emit radiation.

2. The circuit of claim 1 wherein said first switch comprises an enhancement mode field effect transistor and said second switch comprises a depletion mode field effect transistor and wherein the gate electrodes of said transistors comprise said control electrodes.

3. The circuit of claim 2 wherein in each branch one of the source and drain electrodes of said transistors is connected to said light sources, and said responsive means connects the gate electrode of said second transistor to said one electrode of said first transistor.

4. The circuit of claims 1, 2, or 3 wherein said feedback means includes a photodiode responsive to said portion of said radiation of said first source for generating said voltage on said first control electrode.

5. The circuit of claim 4 further including a resistor coupled to said first control electrode, said photodiode being connected in parallel with said resistor, and a capacitor connected in series with the parallel combination of said photodiode and said resistor.

6. The circuit of claims 1, 2 or 3 a drive circuit in series with said sources and wherein said light sources comprise laser diodes and said feedback means comprises
- a photodiode responsive to said portion of said radiation of said first source,
- a feedback circuit having the signal generated by said photodiode as its input, said feedback circuit generating an error signal at its output, and
- comparator means connected to said first control electrode and including means establishing an electrical reference signal related to said parameter level,
- said error signal being applied both to the input of said drive circuit and to the input of said comparator means, and
- said comparator means being adapted to compare said error signal to said reference signal, thereby to apply voltage to said first control electrode effective to turn off said first switch and said first source when the radiation of said first source is outside said prescribed range.

7. The circuit of claims 1, 2, or 3 including an optical fiber for transmitting the radiation generated by said sources, first coupling means for optically coupling said sources to said fiber, and second coupling means for optically coupling said sources to said feedback means.

8. The circuit of claim 7 wherein said light sources comprise laser diodes which emit radiation from opposite mirror faces, and wherein said first coupling means couples the radiation from one of said faces into said fiber and said second coupling means couples the radiation from the other of said faces to said feedback means.

9. A circuit for selectively operating redundant laser diodes comprising
- a drive circuit for modulating the radiation output of said diodes,
- first and second circuit branches connected in parallel between the output of said drive circuit and a source of reference potential,
- said first branch including a normally closed first switch having a first control electrode for opening said first switch, a first laser diode in series with said first switch for generating radiation within a prescribed range of a predetermined parameter level,
- said second circuit branch including a normally opened second switch having a second control electrode for closing said second switch, and a second laser diode in series with said second switch for generating radiation when said second switch is closed,
- feedback means responsive to a portion of the radiation of said first laser diode for generating control voltage coupled to said first control electrode so that said first switch remains closed while the radiation of said first laser diode is within said range and is opened when the radiation of said first laser diode falls outside said range, thereby turning off said first laser diode, and
- means responsive to the switching of said first switch from closed to open for applying voltage to said second control electrode effective to close said second switch and cause said second laser diode to emit radiation.

* * * * *